United States Patent Office 3,295,052
Patented Dec. 27, 1966

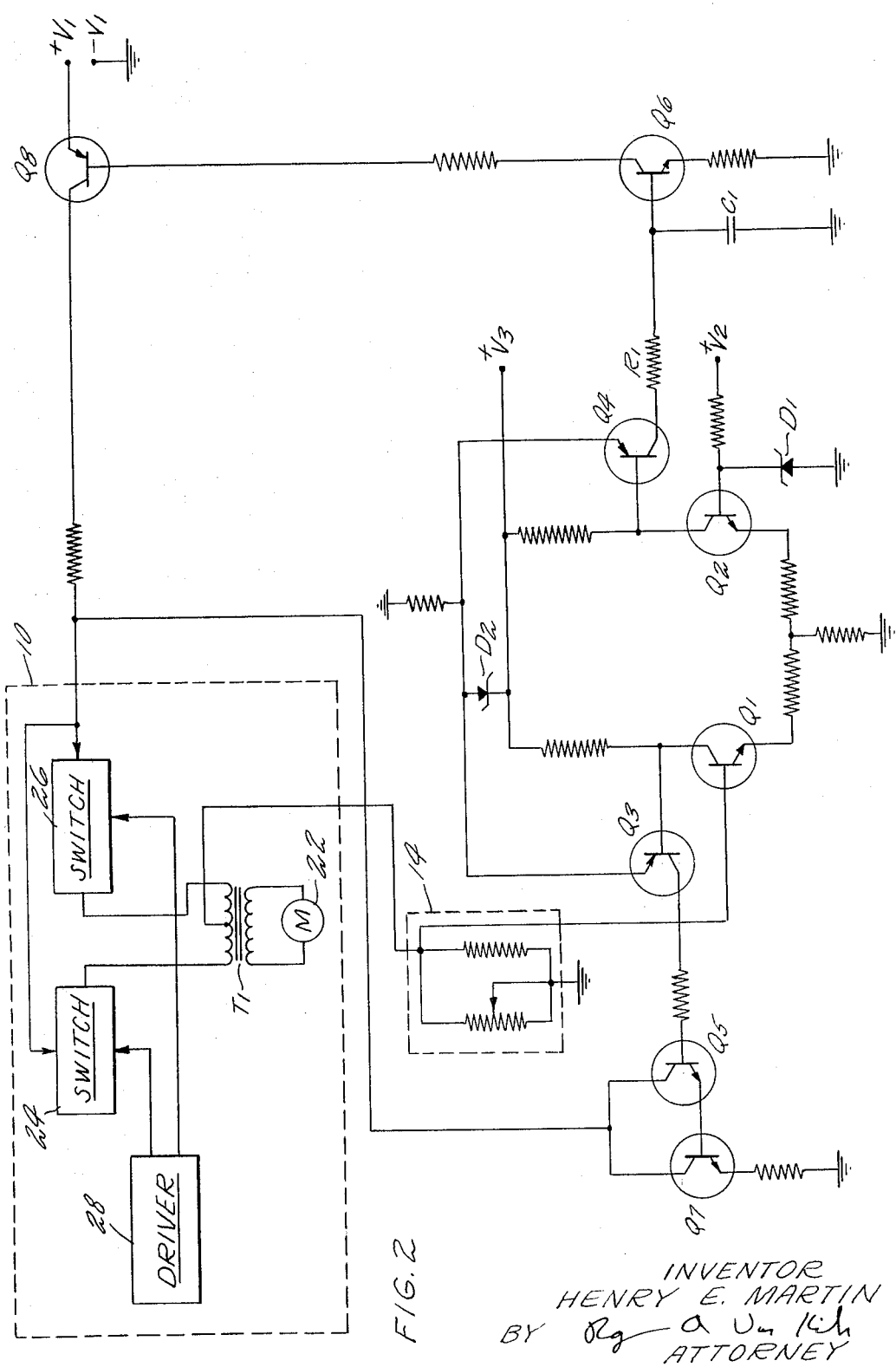

3,295,052
D.C. REGULATION CIRCUIT
Henry E. Martin, Wapping, Conn., assignor to United Aircraft Corporation, East Hartford, Conn., a corporation of Delaware
Filed Apr. 30, 1963, Ser. No. 276,876
3 Claims. (Cl. 323—22)

This invention is directed to a direct current regulation circuit. More particularly, this invention relates to a novel current regulator which employs both series and shunt regulation techniques to achieve greatly improved regulation of the current supplied to a load.

In the prior art, it has been common practice to use series regulators to control the current supplied by a source to the load. These regulators commonly take the form of one or more variable impedance devices connected in series with the load and source of power. Shunt type current regulators, while known in the art, have for the most part been discarded since they are inherently not as efficient as series type regulars. That is, the use of variable impedance elements connected in parallel with the load is not favored due largely to the fact that these devices impose added current drain on the power source. However, the series type current regulator, by itself, cannot provide the extremely high degree of regulation necessary for many present day applications without resort to quite complex circuitry. Further, series regulators, unless coupled with extremely involved temperature compensation circuits, enable drift due to temperature induced variations of component values to vary the power delivered to the load.

My invention overcomes the above disadvantages of the prior art by providing a novel regulator circuit.

It is therefore an object of my invention to provide improved regulation of the power delivered to a load.

It is another object of my invention to provide excellent regulation of the power delivered to a load through use of relatively uncomplicated circuitry.

It is also an object of my invention to provide a novel current regulator in which any temperature induced drift is cancelled out.

It is a further object of my invention to provide an inexpensive and reliable current regulator.

These and other objects of my invention are accomplished by a novel combination of a series and a shunt regulator which are respectively controlled by opposite polarity outputs of a balanced differential amplifier which has, as inputs thereto, signals indicative of the actual and desired load current.

My invention may be better understood and its numerous advantages will become apparent to those skilled in the art by reference to the accompanying drawing wherein like reference numerals apply to like elements in the various figures and in which:

FIGURE 2 is a schematic of the regulator shown in block form in FIGURE 1.

Figure 1:
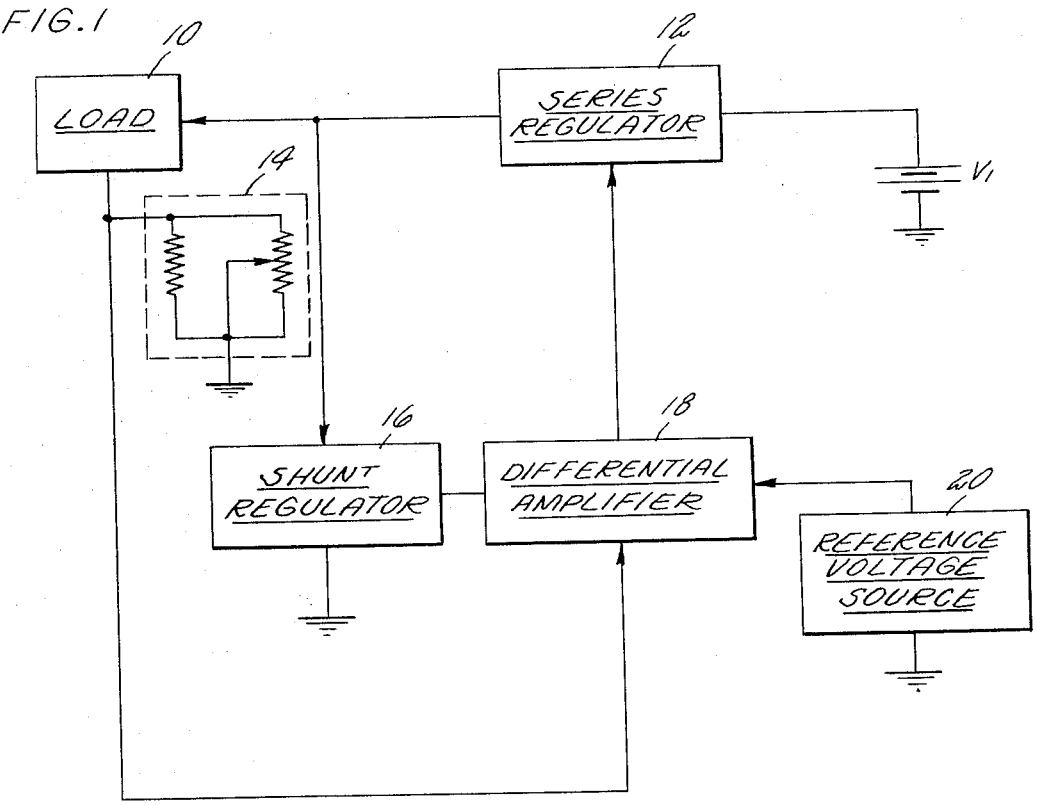
FIGURE 1 is a block diagram of the novel regulator which comprises my invention.

Referring now to FIGURE 1, a source of direct current is represented by battery V1. Current from source V1 is supplied to the load 10, which in the typical aircraft or missile application might be a static inverter driving an A.C. motor, through a series regulator 12. Load 10 is connected to ground through resistance network 14. Also grounded is the negative terminal of current source V1 thereby providing a completed path for the current from source V1 through regulator 12, load 10, resistance network 14, back to the source V1. Connected in parallel with the load 10 and resistance network 14 is a shunt regulator 16. Regulators 12 and 16 are controlled by the outputs of a balanced differential amplifier 18. Amplifier 18 has as a first input thereto a reference voltage, from a reference voltage source 20, which is indicative of the desired load current. The second input to amplifier 18 is a voltage proportional to the actual load current, such voltage being developed across resistor network 14. It is the amplified difference between this latter voltage and the reference voltage that appears at the output terminals of amplifier 18. As will be explained in greater detail below, a difference between the voltage across resistor network 14 and the reference voltage provided by source 20 will cause differential amplifier 18 to produce a pair of opposite polarity output signals. One of these opposite polarity signals is applied to each of regulators 12 and 16 in such a manner that both regulators will aid in returning the load current to its desired value. However, as will also be explained in greater detail below, any drift due to component temperature variations in the series regulator will be exactly balanced out in the shunt regulator and vice-versa. In other words, both regulators act to cancel out drift due to temperature and thus aid each other dynamically.

Referring now to FIGURE 2, transistors Q1 and Q2 form a balanced differential amplifier of a type well-known in the art. By the use of a difference amplifier technique, reduction of the drift caused by variations in gain and power supply voltages is achieved. The input signal proportional to actual load current, taken off resistor network 14, is applied to the base of transistor Q1. The second or reference input to the differential amplifier is applied to the base of transistor Q2. This reference voltage, proportional to the desired load current, is preferably established in a manner well-known in the art by use of a Zener diode D1 connected across a voltage source V2. The output signal from the collector electrode of transistor Q1 is applied to transistor amplifier Q3 and thence to an emitter follower Q5. The output of the emitter follower is applied to the base electrode of a shunt regulator transistor Q7 which is connected in parallel with the load 10. The shunt regulator is thus a fast response circuit.

The output taken from the collector electrode of transistor Q2 is amplified by transistor amplifier Q4 and is then applied to a filter circuit comprised of resistor R1 and capacitor C1. It is the object of this RC filter to impart a lag to the amplified difference signal and to thereby cause the series regulator to have a slow response time. The output of the filter circuit is applied to transistor amplifier Q6 the output of which is in turn applied to the base electrode of series regulator transistor Q8.

A Zener diode D2 is used to provide the correct operating points for transistor amplifiers Q3 and Q4. Since a single diode is used, any voltage variation due to temperature is applied to both transistors thereby providing, in a manner to be described below, a net differential cancellation in the two regulator loops.

In the embodiment of FIGURE 2, the load 10 is depicted as a torque motor 22 connected across the secondary of a transformer T1. The center tap of the primary winding of transformer T1 is connected to the ground negative terminal of current source V1 through the resistor network 14. The positive terminal of source V1 is alternately connected to opposite ends of the primary winding of transformer T1 by a pair of switches 24 and 26 which are alternately closed by a driver circuit 28. Driver circuit 28 may typically be a square wave oscillator supplying a push-pull driver. As switches 24 and 26 are alternately closed by the output of driver 28, current will alternately flow in opposite directions in the primary winding of transformer T1. Thus, closing of switches 24 or 26 completes the circuit from the positive terminal of source V1 through a switch and the center tap of the primary winding T1 to resistor network 14 and thence back to the negative terminal of source V1. Since square wave signals are used to actuate switches 24 and 26, and further since some loads will need equal drive on both half cycles of the switching signal, the response of the series regulator is made slow, as described above, by the use of the RC filter. Thus the series loop controls average load current. The shunt regulator, which has a fast response, balances out steady state errors caused by the effects of temperature and provides regulation on both halves of the switching cycle. It is for the latter reason that the fast time response is needed in the shunt loop. That is, instantaneous load current amplitude is sensed and compared to the reference. By varying the impedance of the shunt path in accordance with the instantaneous current errors, any differences in current between the two half cycles due to different resistances of switches 24 and 26 or the actual or reflected impedances of the opposite halves of the primary of transformer T1 will be regulated out.

Operation of my novel regulator circuits is as follows. Should the load current exceed the desired value, the input to the base of transistor Q1 will exceed the reference voltage applied to the base of transistor Q2. Thus, a positive output voltage will appear at the collector electrode of transistor Q1 and a negative voltage will appear at the collector electrode of transistor Q2. The positive collector voltage on transistor Q1 is applied, by amplifier Q3 and emitter follower Q5 to the base electrode of transistor Q7 causing the latter transistor to either begin or to increase its conduction depending on the circuit parameters. Conduction of transistor Q7 shunts current away from load 10 and back to source V1. At the same time the shunt regulator transistor is increasing conduction, the negative voltage from the collector electrode of transistor Q2 is being applied, through transistors Q4 and Q6, to the base electrode of series regulator transistor Q8 to cause it to become less conductive thereby also reducing load current. Thus, both the series and shunt regulators act together to maintain the load current at the desired value. As should be obvious, when the load current decreases below the desired value, a negative voltage will appear at the collector of transistor Q1 while a positive voltage appears at the collector of transistor Q2. Thus, in a case of an undesired decrease of load current, the series and shunt regulators will again both aid in maintaining the desired load current. However, in the situation where there is drift due to component temperature variations, the outputs of both transistors in the differential amplifier will vary in the same direction. Thus, where the output of transistor Q1 becomes slightly positive because of variations in, for example, the circuit resistors due to temperature effects, the output of transistor Q2 will also become slightly positive. This slightly positive collector voltage on transistor Q1 will cause an increase in the conduction of shunt regulator Q7. This increase in conduction by the shunt regulator will, however, be balanced out by an increase in the conduction of the series regulator Q8 due to the fact that there is also a slightly positive voltage appearing on the collector of transistor Q2. Thus, any drift due to component temperature variation in the shunt loop is exactly balanced out in the series loop and vice-versa. In other words, both loops aid each other dynamically to cancel out any drift due to temperature caused variations in the values of the circuit components.

While a preferred embodiment of my invention has been shown and described, various modifications and substitutions may be made without deviating from the spirit and scope of my invention. Thus, my invention is described by way of illustration rather than limitation and accordingly it is understood that my invention is to be limited only by the appended claims taken in view of the prior art.

I claim:
1. Apparatus for regulating the current delivered from a current source to a load comprising:
 a first variable impedance means connected in series with said source and load,
 a second variable impedance means connected in parallel with said load,
 means providing a signal proportional to load current,
 means providing a reference signal commensurate with desired load current,
 a differential amplifier responsive to said reference and proportional signals for generating first and second opposite polarity control signals indicative of the difference between said signals commensurate with actual and desired load current, and
 means for respectively applying said first and second control signals to said first and second variable impedance means to thereby control the load current.

2. The apparatus of claim 1 wherein the means for applying the control signals to the impedance means comprises:
 means for applying a first polarity control signal from said differential amplifier to the second variable impedance means,
 a lag circuit, and
 means applying the second polarity control signal from said differential control signal to the first variable impedance means through said lag circuit.

3. The apparatus of claim 2 wherein said first and second variable impedance means each comprise:
 three element active circuit devices having the control signals applied to the control electrodes thereof.

References Cited by the Examiner
UNITED STATES PATENTS

| | | |
|---|---|---|
| 3,069,617 | 12/1962 | Mohler. |
| 3,103,617 | 9/1963 | Schneider et al. |
| 3,109,981 | 11/1963 | Muchnick. |
| 3,124,697 | 3/1964 | Trenchard _____ 307—51 |
| 3,124,698 | 3/1964 | Semmer et al. _____ 307—51 |
| 3,174,094 | 3/1965 | Farnsworth et al. _____ 323—18 |

JOHN F. COUCH, *Primary Examiner.*

G. GOLDBERG, *Assistant Examiner.*